(12) United States Patent
Fabris et al.

(10) Patent No.: US 10,955,637 B2
(45) Date of Patent: Mar. 23, 2021

(54) CABLE-RETENTION DEVICE

(71) Applicants: Valcir Fabris, Sorocaba (BR); Luis Carlos Vicente, São Paulo (BR)

(72) Inventors: Valcir Fabris, Sorocaba (BR); Luis Carlos Vicente, São Paulo (BR)

(*) Notice: Subject to any disclaimer, the term of this patent is extended or adjusted under 35 U.S.C. 154(b) by 0 days.

(21) Appl. No.: 16/610,832

(22) PCT Filed: Apr. 27, 2018

(86) PCT No.: PCT/BR2018/050136
§ 371 (c)(1),
(2) Date: Nov. 4, 2019

(87) PCT Pub. No.: WO2018/201211
PCT Pub. Date: Nov. 8, 2018

(65) Prior Publication Data
US 2020/0073072 A1    Mar. 5, 2020

(30) Foreign Application Priority Data
May 2, 2017    (BR) .................. 20 2017 009256 4

(51) Int. Cl.
*G02B 6/48*    (2006.01)
(52) U.S. Cl.
CPC .................. *G02B 6/48* (2013.01)
(58) Field of Classification Search
CPC .................. G02B 6/48; G02B 6/483
See application file for complete search history.

(56) References Cited

U.S. PATENT DOCUMENTS

| | | | |
|---|---|---|---|
| 5,647,046 A | 7/1997 | Cowen et al. | |
| 6,389,213 B1 | 5/2002 | Quesnel | |
| 6,732,981 B2* | 5/2004 | Franks | H02G 7/056 248/58 |
| 7,367,534 B2* | 5/2008 | Franks, Jr. | G02B 6/00 248/74.1 |
| 8,249,412 B2* | 8/2012 | Quesnel | F16G 11/101 385/137 |
| 10,338,335 B2* | 7/2019 | Miller | G02B 6/4478 |
| 2010/0092147 A1* | 4/2010 | Desard | G02B 6/4477 385/135 |
| 2016/0011378 A1* | 1/2016 | Yamaguchi | G02B 6/3806 65/407 |

(Continued)

FOREIGN PATENT DOCUMENTS

| | | |
|---|---|---|
| CN | 206038986 | 3/2017 |
| FR | 2760144 | 8/1998 |

(Continued)

OTHER PUBLICATIONS

International Search Report dated May 29, 2018 in International Application No. PCT/BR2018/050136.

(Continued)

*Primary Examiner* — Rhonda S Peace
(74) *Attorney, Agent, or Firm* — B. Aaron Schulman, Esq.; Stites & Harbison, PLLC

(57) ABSTRACT

A cable retention device useful for fiber optic cable retention, suspension and anchoring, of the drop type and is provided with a retaining element and a housing element, which once coupled retain a drop between them allowing the manipulation of the drop.

6 Claims, 4 Drawing Sheets

(56) References Cited

U.S. PATENT DOCUMENTS

2018/0031794 A1* 2/2018 Sakmar ............... G02B 6/4463
2020/0064579 A1* 2/2020 Allen .................. G02B 6/4477
2020/0073072 A1* 3/2020 Fabris ..................... H02G 7/02

FOREIGN PATENT DOCUMENTS

GB            2178602        2/1987
JP            H8334630       12/1996

OTHER PUBLICATIONS

Written Opinion dated Jun. 29, 2018 in International Application No. PCT/BR2018/050136.
International Preliminary Report on Patentability dated Nov. 5, 2019 in International Application No. PCT/BR2018/050136.

* cited by examiner

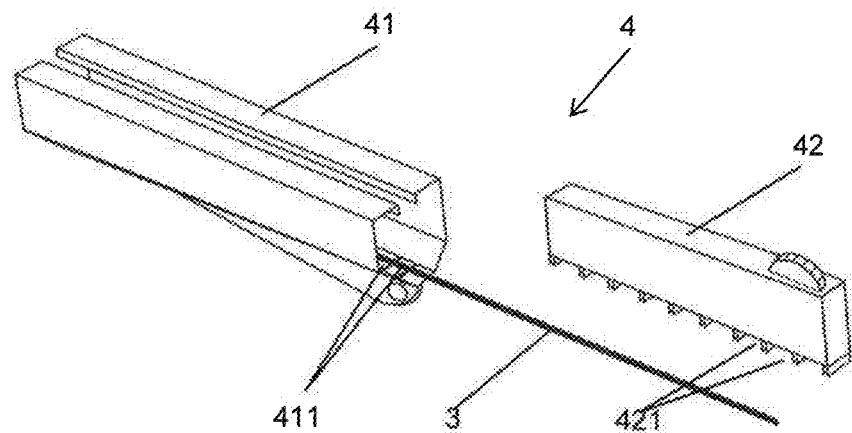
FIG. 1
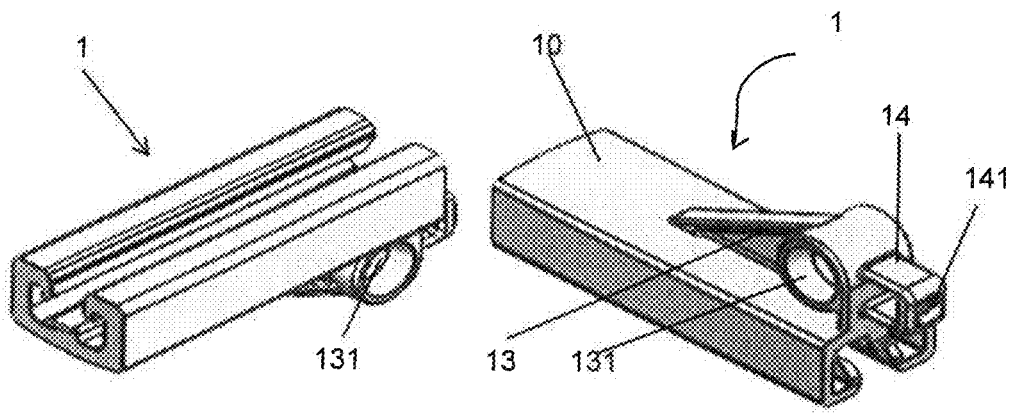
FIG. 2
FIG. 3
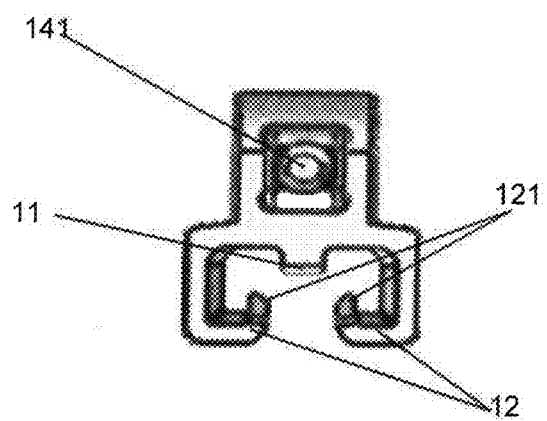
FIG. 4

CABLE-RETENTION DEVICE

FIELD OF THE INVENTION

The present patent application is directed to a cable retention device, more particularly, a fiber optic cable retention, suspension and anchoring device.

DESCRIPTION OF THE PRIOR ART

It is well known to a person skilled in the art to use fiber optic cables (hereinafter referred to as "optical drop") in telecommunication networks.

The optical drops are supported on poles and the connection to the users' residence is made by air, starting from the pole.

To make the connection with the external network (provider) to the internal network (customer), or perform overhead lines maintenance, a retention/anchor device that holds the optical drop must be used, allowing the technician to do the work.

Stretching devices are used for this anchoring of the optical drops to retain and stretch the optical drop at these points. With the aid of a hook attached to the tensioning device, the drops (cables) are fixed, anchored and supported by poles, engaging said hook in a guide ring or pulley handle.

Current devices comprise a hollow body to accommodate the drop and a wedge-like element inserted into the hollow body until it constricts the drop against the hollow body. Both the hollow body and the wedge-like element comprise a plurality of spaced shoulders between which the drop is positioned and is retained by pressure. These devices provide optical drop locking solely by establishing a pressure through the wedge system.

The spaced shoulders, in a disadvantageous way, can cause drop attenuation, which is the loss of signal when there is fiber crush. This can occur because the pressure on the drop is concentrated on said shoulders, which can crush the drop.

Another disadvantage is that these devices do not comprise a specific housing for the drop placement in the hollow body and, in this way, the drop may move within the hollow body upon insertion of the wedge, compromising the attachment of the drop to the device.

SUMMARY OF THE INVENTION

In order to overcome the disadvantages of the prior art devices, it is an object of the present innovation to provide a cable retention device comprising a housing to place the drop, preventing the displacement of the drop upon its attachment to the device. This constructive feature also has the advantage of distributing the pressure forces around the drop, allowing better retention of the optical drop in the device without requiring too much pressure.

The present device also has a uniform structure, offering a uniform pressure in the drop, avoiding its crushing, as occurs in the state of the art.

It is an object of the present innovation an optical drop retention device that provides a homogeneous and uniform retention by locking the entire surface of the drop, including its sidewalls.

It is a further object of the present innovation a device that provides uniform locking, which ensures a distribution of forces across the entire drop surface (top, bottom and side faces) avoiding the concentration of forces at isolated points, preventing the drop to crush, which could lead to attenuations in the optical fiber.

It is also an object of the present innovation a device that provides more security and guarantee for meeting and maintaining the characteristics and requirements of optical drops, optical fiber and, consequently, the service provided by telecommunications providers.

BRIEF DESCRIPTION OF THE DRAWINGS

The present patent application will be described in more detail hereinafter based on an exemplary embodiment shown in the accompanying drawings.

FIG. 1 is an exploded perspective view of an exemplary tensioning device (4) from the state of the art.

FIG. 2 is a bottom perspective view of the retaining element (1) of the device (6) of the present patent application.

FIG. 3 is a top perspective view of the retaining element (1) of the device (6).

FIG. 4 is a right side view of the retaining element (1) shown in FIG. 3.

DETAILED DESCRIPTION OF THE INVENTION

Figure 5:
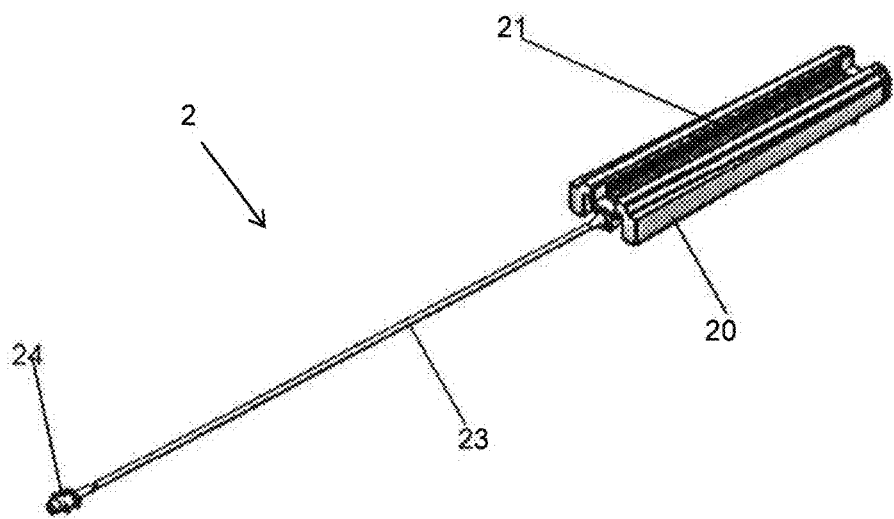
FIG. 5 is a top perspective view of the housing element (2) of the device (6).
Figure 6:
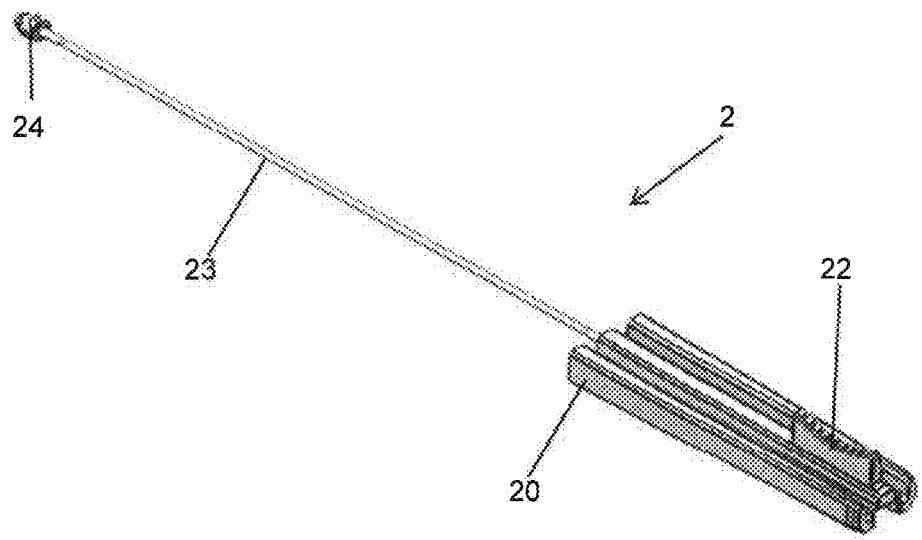
FIG. 6 is a bottom perspective view of the housing element (2).
Figure 7:
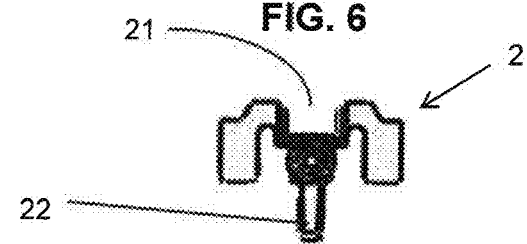
FIG. 7 is a right side view of the housing element (2) shown in FIG. 5.
Figure 8:
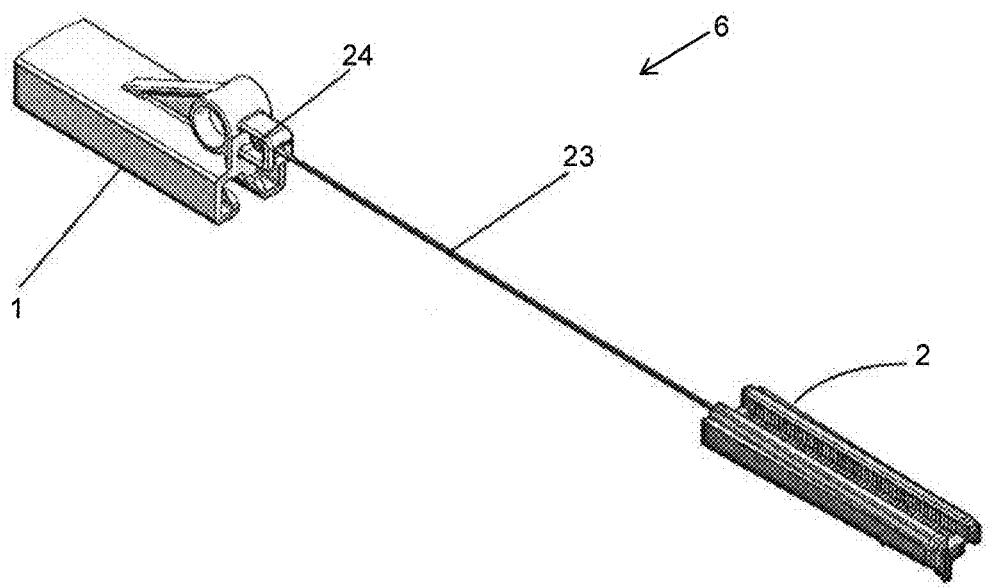
FIG. 8 is a perspective view of the device (6) composed of the retaining (1) and housing (2) elements.

The present innovation refers to a cable retaining device (6) comprising two elements, a retaining element (1) and a housing element (2).

The housing element (2) is an elongated body (20) provided with a channel (21), particularly centered on one side of the body (20), said channel (21) extending along the elongated body (20), extending from one end of the body (20) to the other end.

The channel (21) of the housing element (2) has a locking system formed by grooved faces securing the optical drop (3) by locking it.

The retaining element (1) is an elongated body (10) in the form of a rail suitable for receiving the housing (20) of the housing element (2) by insertion into the body (10). The body (10) of the retaining element (1) has a cross-section, substantially in the shape of laid "C", with a centralized inner shoulder (11), and the edges (12) of the "C" have shoulder (121) facing towards the inner part of the elongated body (10), which ensures better attachment of the housing element (2) to the retaining element (1).

The cross-section of the elongated body (10) is complementary to that of the housing (20) of the housing element (2) except for the shoulder (11) which is spaced from the channel (21), forming a space between them when inserting the body (20) of the housing element (2) into the body (10) of the retainer element (1). Said space is sufficiently smaller than the space occupied by an optical drop (3), so as to allow the positioning of the optical drop (3) in the channel (21) and its retention to the device (6) when inserting the housing element (2) in the retaining element (1), being retained in said space, pressed by the shoulder (11) and the channel (21).

Said retaining element (1) comprises a shoulder (13) from its upper face which is provided with a hole (131) used to receive a hook (5) (see FIGS. 9 and 10) which assists in fixing the device (6) on post pulleys or guide rings (not shown).

The retaining element (1) further comprises a housing (14) from the shoulder (13), the housing being provided with an opening (141) (see FIG. 3).

Said housing element (2) further comprises a cable (23) from one end of the body (20), and at the opposite end of the cable (23) there is a enlargement (24) in the form of a diametrical widening of the cable (23) suitable for coupling in the housing (14) through the opening (141) of the retaining element (1), which allows the housing element (2) to be secured to the retaining element (1), facilitating the use of the device (6) when attaching it to an optical drop (3).

The housing element (2) further comprises a protrusion (22) on its lower face which is used to be pressed by the user when inserting and sliding the housing element (2) into the retaining element (1).

Figure 9:
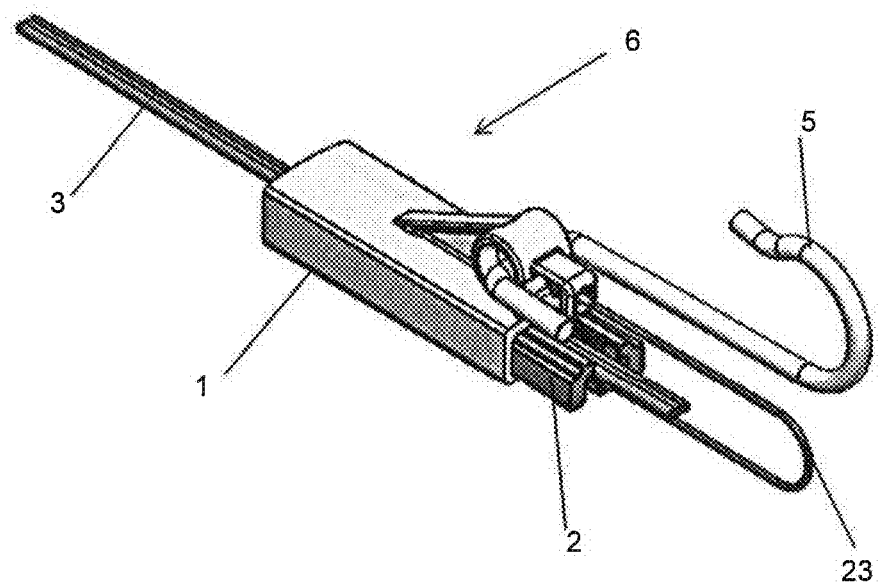
FIG. 9 is a top perspective view of the device (6) with the retaining (1) and housing (2) elements coupled, enclosing a drop (3) between them.
Figure 10:
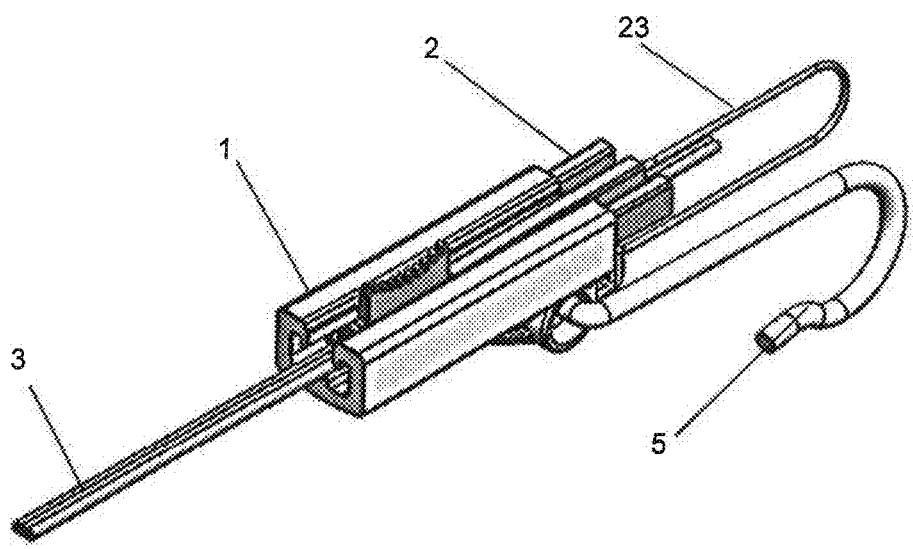
FIG. 10 is a bottom perspective view of the device (6) with the retaining (1) and housing (2) elements coupled, enclosing a drop (3) between them.
Figure 11:
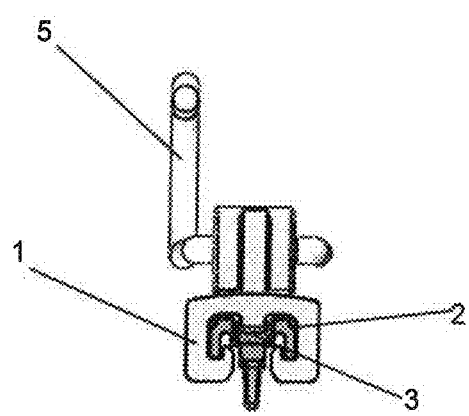
FIG. 11 is a left side view of the device (6) shown in FIG. 9.

For the use of the device (6), as illustrated in FIGS. 9, 10 and 11, the optical drop (3) is firstly positioned in the channel (21) of the housing element (2), after which it is inserted the housing element (2) on the retaining element (1) until the drop (3) is retained within the device (6).

By inserting the housing element (2) into the retaining element (1), with the optical drop (3) in the channel (21), the optical drop (3) is pressed between the grooves of the channel (21) and the shoulder (11) and, in this manner, it is anchored to the device (6) by the pressure applied along and around the entire outer surface of the optical drop (3) retained on the device (6).

As a state of the art device reference, there is the device illustrated in FIG. 1, which is provided with two elements, being a wedge-shaped element (42) which is inserted into a hollow body (41) wherein it was previously positioned the optical drop (3). This device is not suitable, as the optical drop (3) is held in the device by means of protrusions (411) and (421), where the compressive forces are concentrated, which may compromise the signal due to its attenuation. Moreover, this device does not prevent the drop (3) from moving to the sides of the hollow body (41) when inserting the wedge (42), which does not allow proper retention of the optical drop (3), that can become loose.

Having described an example of preferred embodiment, it should be understood that the scope of the present innovation is limited only by the content of the appended claims, including the possible equivalents thereof.

The invention claimed is:

1. A cable retention device provided with two elements:
   a. a retaining element (1); and
   b. a housing element (2);
      wherein the housing element (2) comprises an elongated body (20) with a channel (21) on a first face of the body (20), the channel (21) extending along the elongated body (20) and the channel (21) having a locking system formed by grooved faces that retain an optical drop (3), locking the drop (3); and
      wherein the retaining element (1) comprises an elongated body (10) of cross-section substantially in a "C" shape, with an inner shoulder (11) of cross-section complementary to that of the body (20) of the housing element (2) except for a space created between the shoulder (11) and the channel (21) upon insertion of the body (20) of the housing element (2), the space being sufficiently smaller than the optical drop (3) in order to retain the optical drop (3).

2. The cable retention device according to claim 1, wherein two edges (12) of the body (10) have shoulders (121) facing an inner part of the elongated body (10).

3. The cable retention device according to claim 1, wherein the retaining element (1) comprises a shoulder (13) that extends from an upper face, with the shoulder (13) being provided with a hole (131) where a hook (5) attaches.

4. The cable retention device according to claim 1, wherein the retaining element (1) further comprises a housing (14) from the shoulder (13), the housing being provided with an opening (141).

5. The cable retention device according to claim 1, wherein the housing element (2) further comprises:
   a. a cable (23) with a first end extending from a first end of the body (20); and
   b. an enlargement (24) attached to a second end of the cable (23) in the form of a diametrical widening of the cable (23) suitable for coupling the housing (14) through the opening (141) of the retaining element (1).

6. The cable retention device according to claim 1, wherein the housing element (2) further comprises a protrusion (22) on a lower face.

* * * * *